US007042617B2

(12) United States Patent
Kosc et al.

(10) Patent No.: US 7,042,617 B2
(45) Date of Patent: May 9, 2006

(54) OPTICAL DEVICES HAVING FLAKES SUSPENDED IN A HOST FLUID TO PROVIDE A FLAKE/FLUID SYSTEM PROVIDING FLAKES WITH ANGULARLY DEPENDENT OPTICAL PROPERTIES IN RESPONSE TO AN ALTERNATING CURRENT ELECTRIC FIELD DUE TO THE DIELECTRIC PROPERTIES OF THE SYSTEM

(75) Inventors: Tanya Z. Kosc, Rochester, NY (US); Kenneth L. Marshall, Rochester, NY (US); Stephen D. Jacobs, Pittsford, NY (US)

(73) Assignee: The University of Rochester, Rochester, NY (US)

( * ) Notice: Subject to any disclaimer, the term of this patent is extended or adjusted under 35 U.S.C. 154(b) by 445 days.

(21) Appl. No.: 10/405,163

(22) Filed: Apr. 2, 2003

(65) Prior Publication Data

US 2004/0196226 A1 Oct. 7, 2004

(51) Int. Cl.
*G02F 1/13* (2006.01)
(52) U.S. Cl. .................. 359/272; 354/273; 349/16
(58) Field of Classification Search ................ 359/272, 359/273; 349/16
See application file for complete search history.

(56) References Cited

U.S. PATENT DOCUMENTS

| 3,406,363 A | 10/1968 | Tate |
| 3,668,106 A | 6/1972 | Ota |
| 3,841,732 A | 10/1974 | Marks |
| 3,967,265 A | 6/1976 | Jacob |
| 4,076,387 A | 2/1978 | Haas et al. |
| 4,126,528 A | 11/1978 | Chiang |
| 4,126,854 A | 11/1978 | Sheridon |
| 4,143,103 A | 3/1979 | Sheridon |
| 4,270,841 A | 6/1981 | Saxe |
| 4,285,801 A | 8/1981 | Chiang |
| 4,298,448 A | 11/1981 | Muller et al. |

(Continued)

FOREIGN PATENT DOCUMENTS

GB 2276883 10/1994

(Continued)

OTHER PUBLICATIONS

D. Cairnes et al., SID Digest of Technical Papers, XXX, 725-728 (1999).

(Continued)

*Primary Examiner*—Scott J. Sugarman
*Assistant Examiner*—Richard Hanig
(74) *Attorney, Agent, or Firm*—Kenneth J. Lukacher; Martin Lukacher

(57) ABSTRACT

Optical devices utilizing flakes (also called platelets) suspended in a host fluid have optical characteristics, such as reflective properties, which are angular dependent in response to an AC field. The reflectivity may be Bragg-like, and the characteristics are obtained through the use of flakes of liquid crystal material, such as polymer liquid crystal (PLC) materials including polymer cholesteric liquid crystal (PCLC) and polymer nematic liquid crystal (PNLC) material or birefringent polymers (BP). The host fluid may be propylene carbonate, poly(ethylene glycol) or other fluids or fluid mixtures having fluid conductivity to support conductivity in the flake/host system. AC field dependent rotation of 90° can be obtained at rates and field intensities dependent upon the frequency and magnitude of the AC field. The devices are useful in providing displays, polarizers, filters, spatial light modulators and wherever switchable polarizing, reflecting, and transmission properties are desired.

40 Claims, 6 Drawing Sheets

U.S. PATENT DOCUMENTS

| | | |
|---|---|---|
| 4,305,807 A | 12/1981 | Somlyody |
| 4,311,361 A | 1/1982 | Somlyody |
| 4,657,349 A | 4/1987 | Labes et al. |
| 4,680,103 A | 7/1987 | Beilin et al. |
| 4,688,900 A | 8/1987 | Doane et al. |
| 4,707,080 A | 11/1987 | Fergason |
| 4,919,521 A | 4/1990 | Tada et al. |
| 5,059,245 A | 10/1991 | Phillips et al. |
| 5,279,657 A | 1/1994 | Phillips et al. |
| 5,344,594 A | 9/1994 | Sheridon |
| 5,364,557 A | 11/1994 | Faris et al. |
| 5,380,362 A | 1/1995 | Schubert |
| 5,389,945 A | 2/1995 | Sheridon et al. |
| 5,523,863 A | 6/1996 | Fergason |
| 5,587,242 A | 12/1996 | Hou et al. |
| 5,650,872 A | 7/1997 | Saxe et al. |
| 5,691,789 A | 11/1997 | Li |
| 5,691,795 A | 11/1997 | Doane et al. |
| 5,708,525 A | 1/1998 | Sheridon |
| 5,717,283 A | 2/1998 | Biegelsen et al. |
| 5,717,514 A | 2/1998 | Sheridon |
| 5,737,115 A | 4/1998 | Mackinlay et al. |
| 5,739,801 A | 4/1998 | Sheridon |
| 5,751,268 A | 5/1998 | Sheridon |
| 5,754,332 A | 5/1998 | Crowley |
| 5,760,761 A | 6/1998 | Sheridon |
| 5,767,826 A | 6/1998 | Sheridon et al. |
| 5,825,529 A | 10/1998 | Crowley |
| 5,851,604 A | 12/1998 | Muller-Rees et al. |
| 5,961,804 A | 10/1999 | Jacobson et al. |
| 6,017,584 A | 1/2000 | Albert et al. |
| 6,291,065 B1 | 9/2001 | Poetsch et al. |
| 6,392,785 B1 | 5/2002 | Albert et al. |
| 6,422,687 B1 | 7/2002 | Jacobson |
| 6,497,942 B1 | 12/2002 | Sheridon et al. |
| 6,515,649 B1 | 2/2003 | Albert et al. |
| 6,665,042 B1 * | 12/2003 | Marshall et al. ............ 349/166 |

FOREIGN PATENT DOCUMENTS

| | | |
|---|---|---|
| WO | WO 01/88607 A1 | 11/2001 |

OTHER PUBLICATIONS

E. Korenic et al., Mol. Cryst. Liq. Cryst. 317, 197-219 (1998).

Kosc, Tanya et al., Electric-field-induced motion of polymer cholesteric liquid-crystal flakes in a moderately conductive fluid, Applied Optics, vol. 41, No. 25, pp. 5362-5366 (2002).

Srinivasan, U. et al., MEMS: Some Self-Assembly Required, Optics & Photonics News, pp. 21-24 (Nov. 2002).

Branham, Michael et al., Rapid Communications: Rapid prototyping of micropatterned substrates using conventional laser printers, J. Mater. Res., vol. 17, No. 7, pp. 1559-1562 (2002).

Kumar, A. et al., Features of gold having micrometer to centimeter dimensions can be formed through a combination of stamping with an elastomeric stamp and an alkanethiol "ink" followed by chemical etching, Appl. Phys. Lett. vol. 63, No. 14, pp. 2002-2004 (1993).

van Renesse, R., Liquid Crystal Security Devices, Optical Document Security, Artech House, Boston, pp. 263-280 (1994).

Korenic, E., Colorimetry of cholesteric liquid crystals, Ph.D. dissertation, University of Rochester, Rochester, NY (1997).

Winslow, W., Induced Fibration of Suspensions, J. Appl. Phys., vol. 20, 1137-1140 (1949).

Yu, B. et al., Developments in Suspended Particle Devices (SPD) Optical Materials Technology for Energy Efficiency and Solar Energy Conversion XV, Lampert, C. et al. eds., Proc. SPIE 3138, pp. 217-225 (1997).

Ota, I. et al., Electrophoretic Image Display (EPID) Panel, Proc. IEEE, vol. 61, No. 7, pp. 832-836 (1973).

Fergason, J., Polymer Encapsulated Nematic Liquid Crystals for Display and Light Control Applications, in 1985 Society for Information Display International Symposium, Digest of Technical Papers, J. Morreale, ed. (Pallisades Institute of Research Services, NY, pp. 68-70 (1985).

Comiskey, B. et al., An electrophoretic ink for all-printed reflective electronic displays, Nature, vol. 394, pp. 253-255 (1998).

Sheridon, N. et al., The Gyricon rotating ball display, Journal of the SID, vol. 7, No. 2, pp. 141-144 (1999).

Okagawa, A. et al., Particle Behavior in Shear and Electric Fields, VI. The Microrheology of Rigid Spheroids, J. Colloid Interface Sci., vol. 47, No. 2, pp. 536-567 (1974).

T.B. Jones, Electromechanics of Particles, Cambridge Press, New York (1995).

* cited by examiner

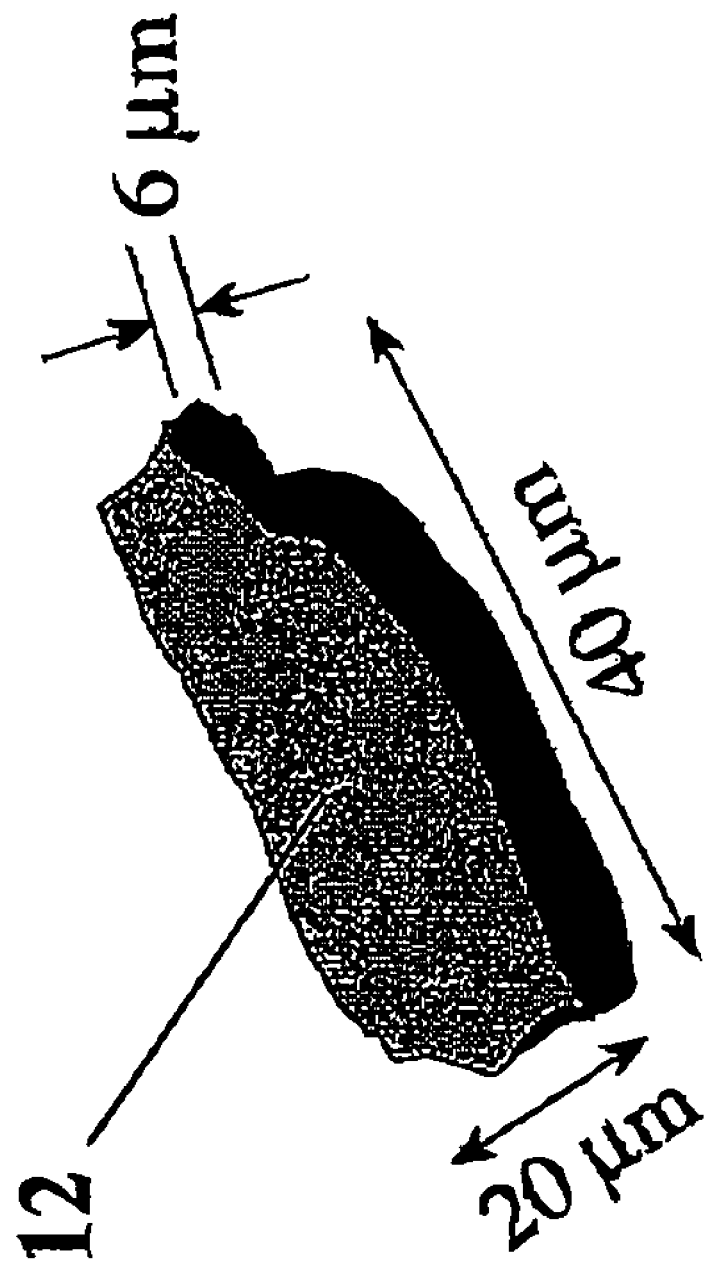

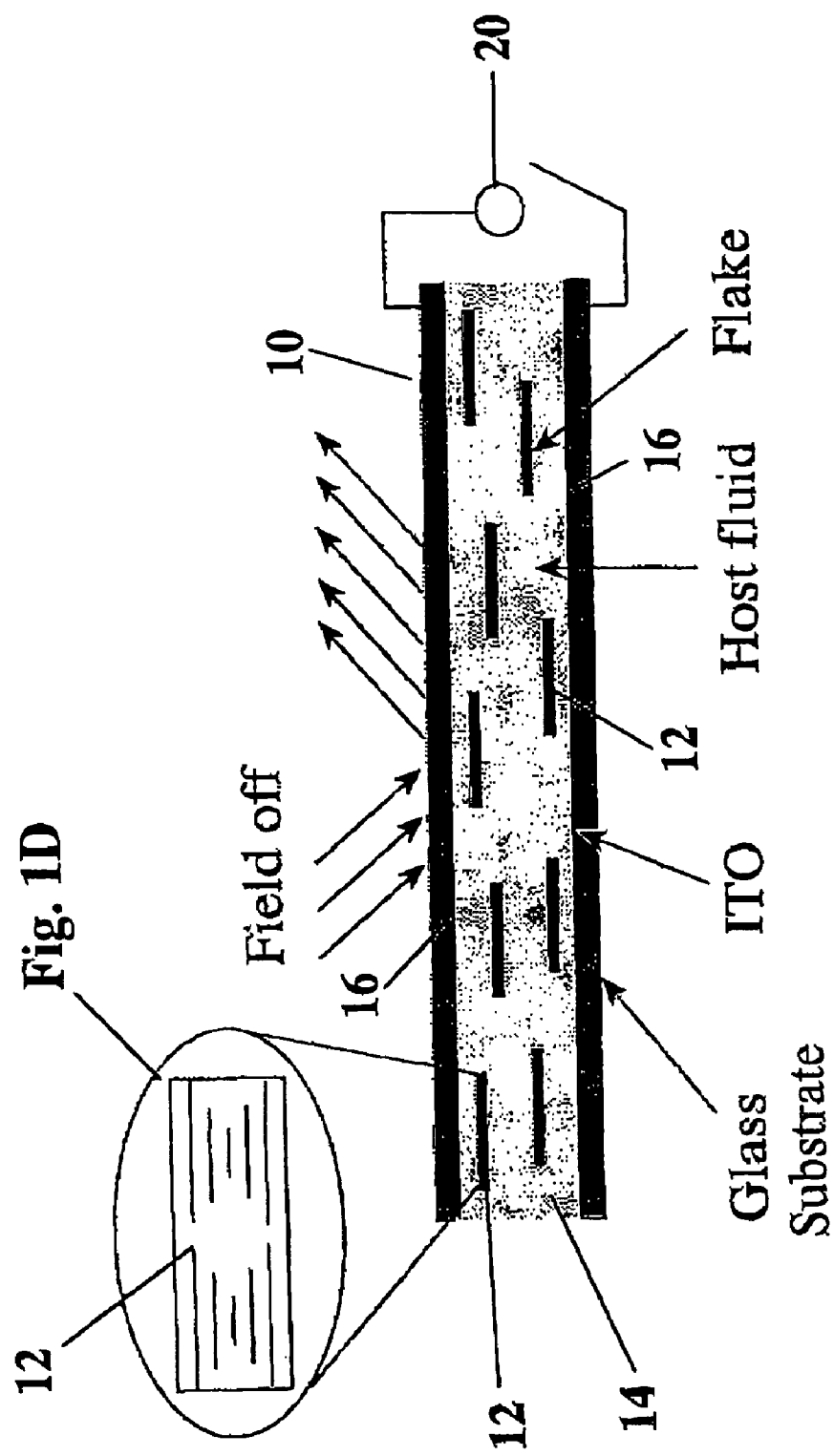

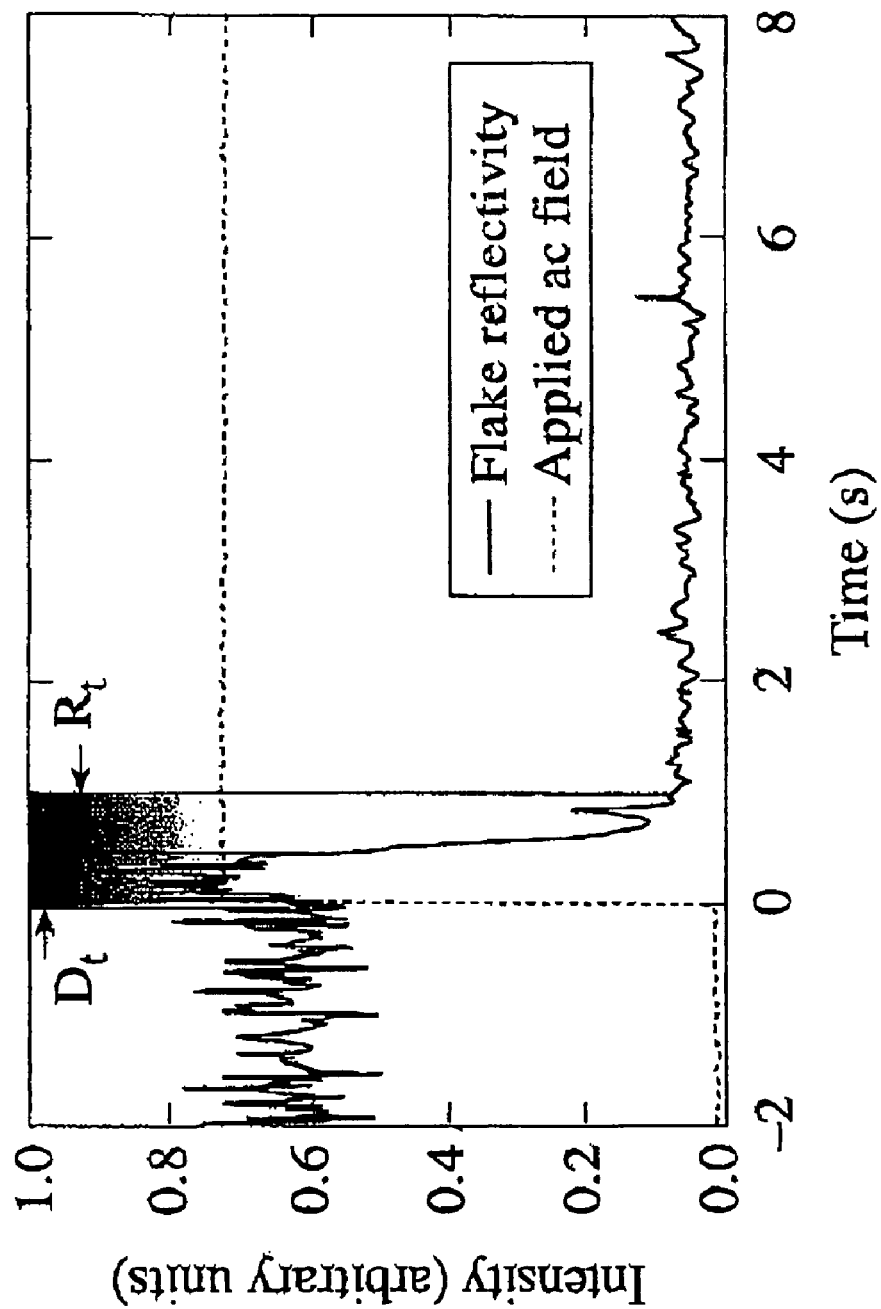

OPTICAL DEVICES HAVING FLAKES SUSPENDED IN A HOST FLUID TO PROVIDE A FLAKE/FLUID SYSTEM PROVIDING FLAKES WITH ANGULARLY DEPENDENT OPTICAL PROPERTIES IN RESPONSE TO AN ALTERNATING CURRENT ELECTRIC FIELD DUE TO THE DIELECTRIC PROPERTIES OF THE SYSTEM

The United States Government has rights in this invention pursuant to Department of Energy, Agreement No. DE-FC03-92SF19460.

The present invention relates to optical devices using AC field addressable flakes (which term includes platelets) having angular dependent optical properties which are enhanced when the flakes are suspended in a host fluid which provides a flake/fluid system having conductivity. More particularly, the invention relates to such devices where the flake materials have angular dependent reflectivity and are useful as active elements in electro-optic reflective particle devices such as particle displays. The flakes are constituted of PLC materials, preferably those that incorporate cholesteric (chiral) molecular structural elements (i.e., polymer cholesteric liquid crystal (PCLC) or polymer nematic liquid crystal (PNLC) materials); it being understood that other polymer liquid crystals (PLC) or other birefringent polymers (BP) may provide the flakes.

This invention is an improvement over the invention described in U.S. patent application Ser. No. 09/571,805, filed May 16, 2000, now U.S. Pat. No. 6,665,042, issued Dec. 16, 2003 and published in International Publication WO 01/88607, published on Nov. 22, 2001, which are incorporated by this reference herein. Further reference may be had to this application and publication for an understanding of background particle display technology. The referenced application and publication describes optical devices and systems using PLC or BP and particularly PCLC flakes suspended in a low viscosity host fluid, and electric fields were used to control flake motion and thus the optical properties. Both DC electric fields and very low frequency square wave AC fields were used to drive PCLC flakes that possessed little or no intrinsic dielectric anisotropy. The oblongly-shaped PCLC flakes showed strong selective reflection when lying parallel or nearly parallel to the substrates of a conventional sandwich cell. As their orientation with respect to normally incident light changes, their selective reflection color shifted toward the blue and diminished until the flakes were no longer easily visible beyond 7–12° of rotation. The angle at which flakes stop reflecting was dependent upon the pitch length and the birefringence of the PCLC and changes accordingly. Analogous optical effects in non-cholesteric PLC's and stacked thin films may also be obtained.

The referenced application and publication also provides examples of cells incorporating flake/host fluid suspensions and methods for the fabrication thereof, and the design and fabrication of such cells may be obtained from the referenced application and publication.

It has been discovered in accordance with this invention that the dielectric properties of the flake/host fluid system determine the angular motion response of the flakes, and can control their reorientation from partial (e.g., 7–12° as discussed in the referenced application and publication) to 90° reorientation. The flakes rotate about their long axis to align parallel to an applied AC field. It was discovered in accordance with the invention that flake rotation is dependent principally on the dielectric permittivity of the system, and particularly the difference in dielectric permittivity as obtained by use of a host fluid which is significantly different in conductivity from the conductivity of the flake material. This difference in conductivity of the material of the flakes from the host fluid to obtain the significant angular dependence on an applied AC field is at least about $10^{-7}$ Mho/cm when the flakes are nonconductive and have low, single digit magnitude of dielectric permittivity. The host fluid conductivity is in the range of from $10^{-7}$ to about $10^{-4}$ Mho/cm, and preferably at least about $10^{-6}$ Mho/cm.

In addition to dielectric properties (dielectric permittivity and conductivity of the flake/host fluid system) angular response in an AC field has been discovered to depend also upon electric field frequency, electric field magnitude, and flake shape. Elongated flakes tend to reorient angularly quicker than non-elongated flakes. The motion of the flakes in the AC field has an inverse quadratic dependence upon the magnitude of the applied electric field. Host fluid viscosity also affects the rate of reorientation. The rate of reorientation also depends upon frequency of the applied field and frequency used is dictated by the dielectric properties of the flake/host system and primarily the host fluid conductivity.

Accordingly, it is the principal object of the present invention to provide improved electro-optic devices which are based upon flake/host fluid systems.

It is a more specific object of the present invention to provide electro-optical devices having AC field addressable flake materials with angular dependent reflectivity such as PLC, BP, or PCLC flakes.

It is a further object of the present invention to provide electro-optical devices having flake/host fluid systems having flake reorienting properties which are made AC field dependent by selecting the dielectric constant of the system, and particularly the conductivity of the host fluid.

It is a still further object of the invention to provide electro-optical devices having flakes that rotate or reorient in the presence of an AC field, where the flakes need not have dielectric anisotropy and where motion does not occur because of electrophoretic or dielectrophoretic effects, and may result from an orientational torque when an AC field is applied that results from induced polarization which has been referred to as interfacial or Maxwell-Wagner polarization.

It is a still further object of the present invention to provide an electro-optical device having flakes suspended in a fluid host that are reorientable perpendicular to the substrates which define the walls of a cell containing the flake/host (suspension) system, and have angular reorientation consistently at least twice as large as that obtainable in flake/host systems such as those described in the above-referenced patent application and publication.

It is a still further object of the present invention to provide an electro-optic device having AC field addressable flake materials dispersed in a host fluid in which driving voltage levels for creating the AC field are reduced and the rate at which the flakes rotate, or switch back when the field is removed, is increased from levels and rates heretofore reported in the above-referenced application and publication.

The foregoing and other objects, features and advantages of the invention will become more apparent from reading of the following description in connection with the accompanying drawings in which:

FIG. 1A is a perspective view of a typical irregularly shaped PCLC flake which is usable in an optical device, particularly in a cell containing a flake/fluid host suspension as shown in FIGS. 1B and 1C;

FIG. 1B is a schematic diagram of a cell incorporating the flake/host suspension where the flakes lie approximately parallel to the cell substrates or walls as occurs where no electric field is applied;

FIG. 1D is a schematic diagram of the surface of the flake used in the cell of FIGS. 1B and 1C showing the molecular orientation in the flakes which facilitates Bragg-like reflection when the flakes are oriented as shown in FIG. 1B;

Figure 3:
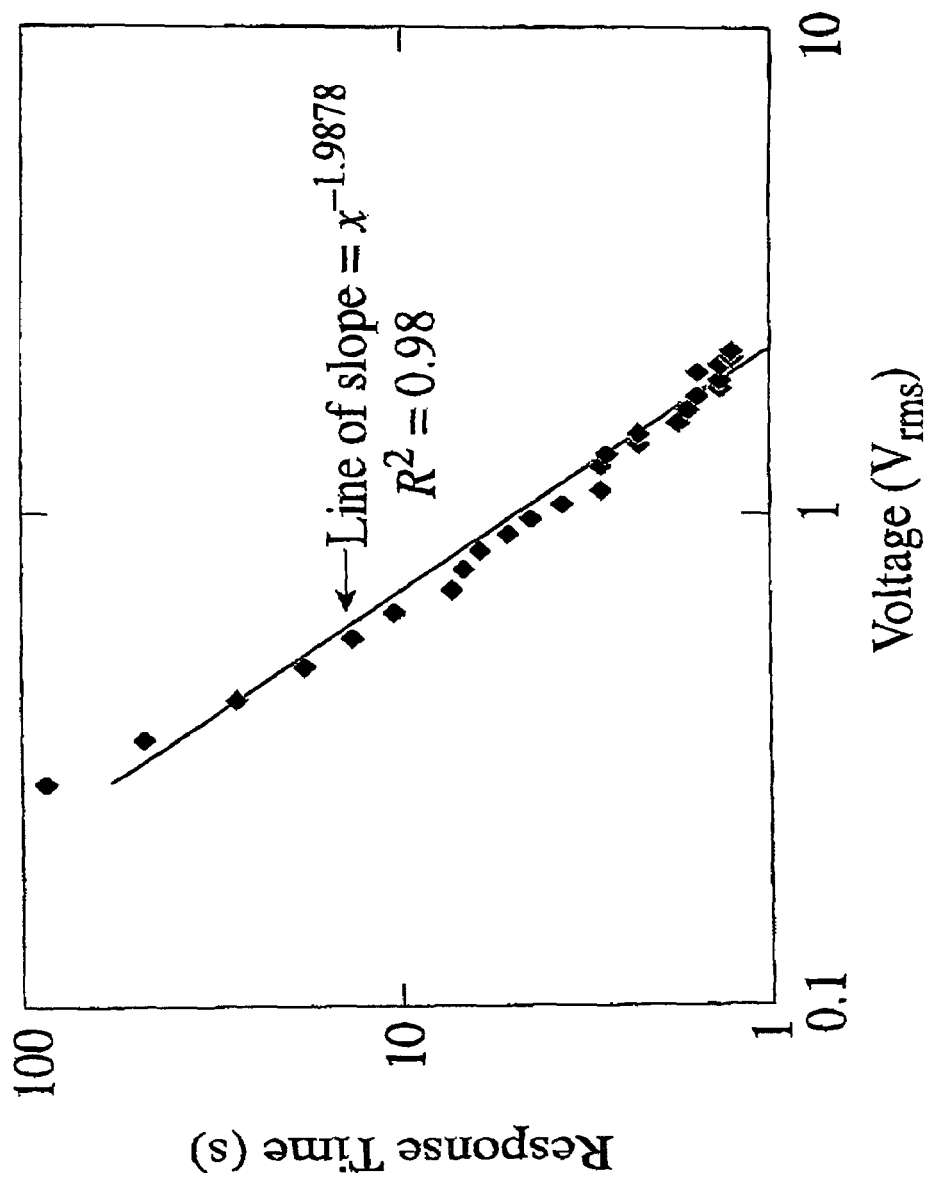

FIG. 3 is another plot showing that the average response time of several small flakes has an inverse quadratic dependence on the applied voltage (the standard deviation of 10% is of the order of the size of the data points); and FIG. 4 is a plot showing the response for a flake motion in a $0.17V_{rms}/\mu m$ field at 70 Hz was studied with a PMT detecting light reflected from the flake surface and shows that initially, the flake reflected brightly, within 500 ms the flake reoriented and there was no selective reflection from the flake to detect, and that the resulting contrast ratio, with no attempt to eliminate light from other flakes and sources of scatter, was approximately 10:1.

DETAILED DESCRIPTION

Figure 1C:
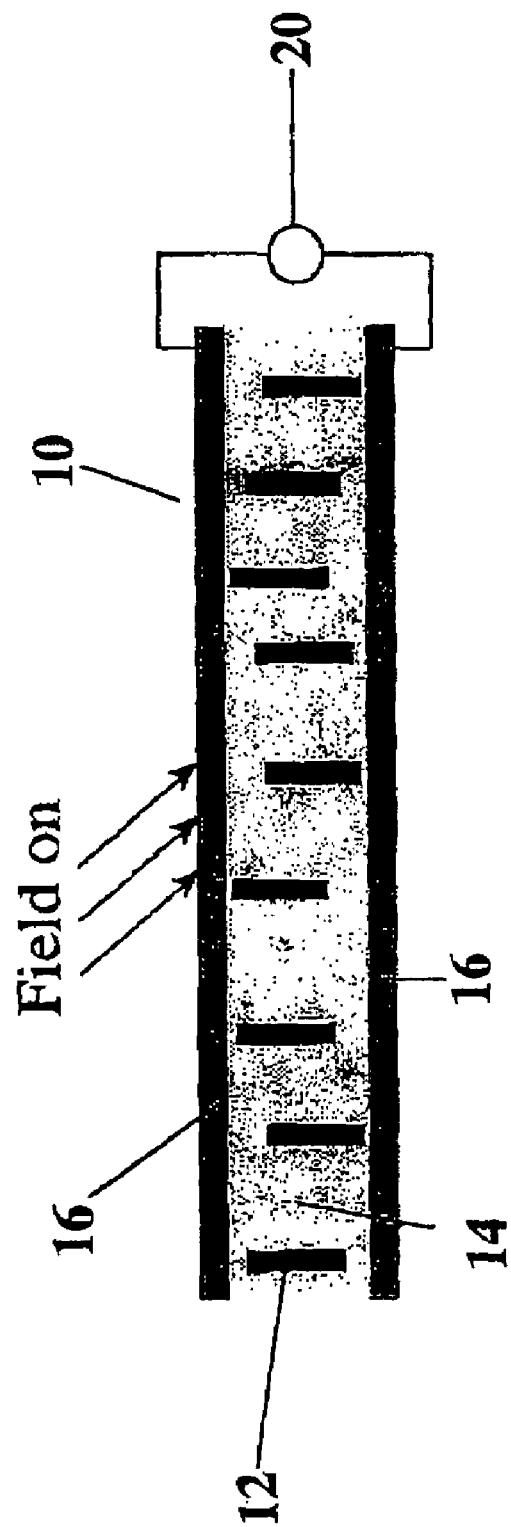
FIG. 1C is a view similar to FIG. 1B showing the flakes reoriented with their long axis parallel to the field when applied and perpendicular to the substrates.

Referring to FIGS. 1A–1D, the basic device 10 embodying the invention. The device 10 represents a cell having a suspension of PCLC flakes 12 in a moderately conductive ($10^{-7}$ to $10^{-4}$ Mho/cm) host fluid 14. This provides a flake/fluid system. Specific examples of such a host fluid are propylene carbonate or poly(ethylene glycol), but other fluids with moderate conductivity that are chemically compatible with the PCLC flake material may be used as well. Examples of flake/host systems are given below. The device 10 is constructed using pairs of 25×25×3 mm indium tin oxide (ITO) coated (on inside facing the suspension) glass substrates 16. Uniform cell gaps between the substrates may be set by spacers (e.g., beads, fibers, or gaskets). The device 10 may be filled with the flake/host fluid suspension 14 using capillary action. The device 10 may be driven with an AC, sinusoidal wave function from a source 20, but any periodic waveform may be used. Waveform bursts or DC spikes may be used prior to or following the main driving voltage waveform to help control or alter flake behavior. The details of device construction were already disclosed in the above-referenced incorporated U.S. Patent Application and Publication. PCLC flakes 12 in the flake/host fluid system respond to AC electric fields by rotating approximately 90° about one axis, most commonly that which is parallel to the longest flake dimension. A typical flake 12 is shown in FIG. 1A. Flakes lying in the plane defined by the substrates reflected brightly (FIG. 1B), but once they reoriented perpendicular to the substrates, little light is reflected (FIG. 1C).

Figure 2:
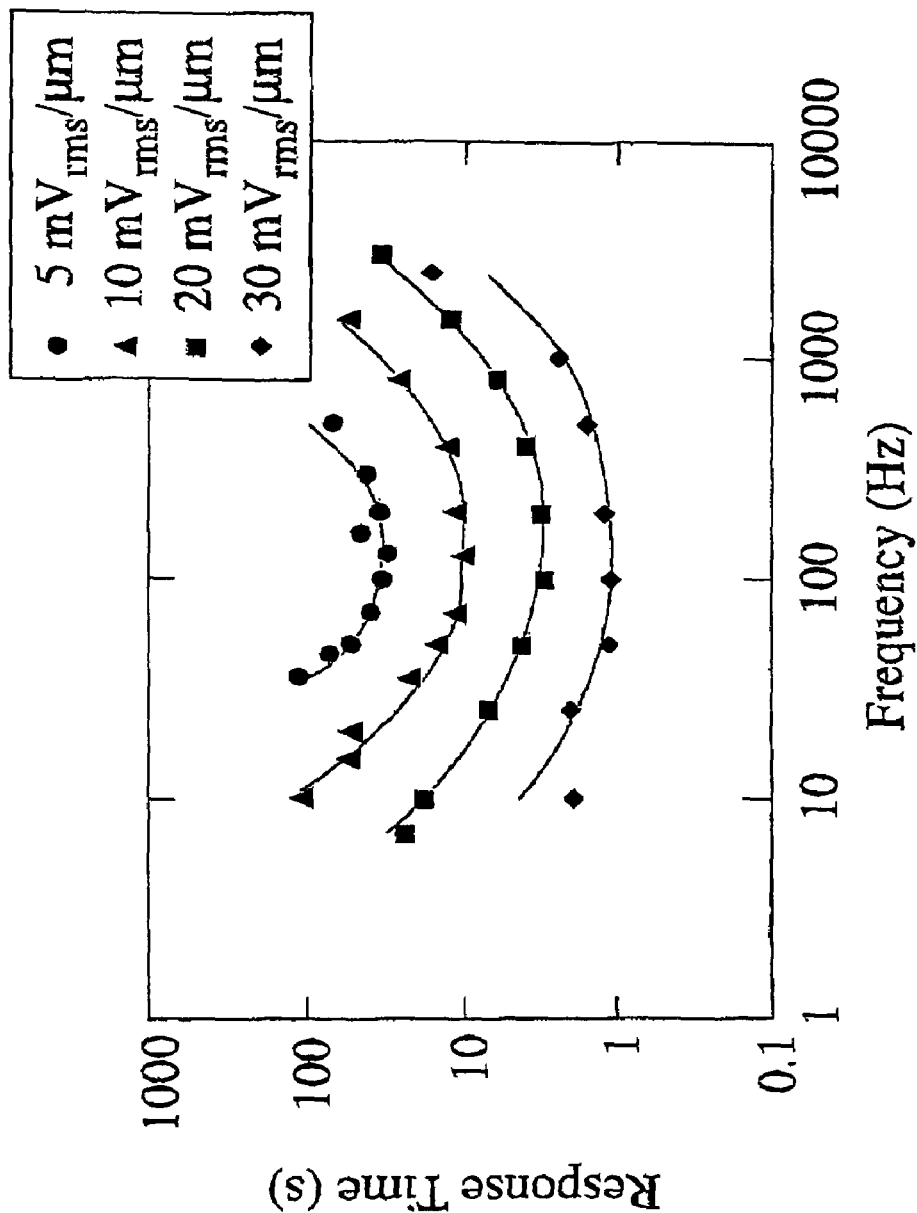
FIG. 2 is a plot showing the characteristic time response of a representative PCLC flake as a function of frequency at specific electric field values.

Flake motion occurs with low electric fields (5 $mV_{rms}/\mu m$) within a specific frequency bandwidth defined as the range where the flake response time increased by a factor of 3 from the fastest response detected. For a single, isolated flake responding to a 5 $mV_{rms}/\mu m$, 130 Hz field, the fastest observed response time was 47 seconds (FIG. 2). The frequency bandwidth extended from 45 Hz to 500 Hz for this very low magnitude field. As the magnitude of the driving field increased to 30 $mV_{rms}/\mu m$, the frequency range for motion broadened to extend from approximately 25 Hz to 1000 Hz. This six-fold increase in voltage also reduced the reorientation time for the flake to <1 second. Response times at higher drive voltages and a constant frequency of 50 Hz showed that flake motion has an inverse quadratic dependence on the electric field (FIG. 3).

The intensity reflected from the flake surface may be detected by a photomultiplier tube, which allowed a quantitative measurement of flake response by detecting light reflected from the flake surface. In the presence of a $0.17V_{rms}/\mu m$ (70 Hz) field there was a delay time, $D_t$, of 140 ms for the flake to initiate movement after the field was first applied. The flake then completed the full reorientation, as determined by its reflectivity shifting from a maximum to a minimum value, with a rise time, $R_t$, of 360 ms. The total reorientation time, the sum of $D_t$ and the $R_t$, was therefore ~500 ms. The delay time is attributed to the time necessary for an insulating PCLC flake to acquire a dipole moment.

Electrophoresis can be discounted as the main mechanism for flake reorientation because PCLC flakes are not charged initially, but instead acquire an induced polarization that is presumed to come from migrating charges. Additionally, effects based on electrophoresis are linear with respect to the applied voltage and cause translational motion in contrast to the mainly rotational motion as occurs in these PCLC flake/fluid host systems. Dielectrophoresis, which requires an electric field gradient, can also be eliminated as a possible effect contributing to flake motion since the electric fields applied to test cells were uniform to within ±3%. The mechanism that governs PCLC flake reorientation in host fluids with non-negligible conductivity is believed to be an orientational effect caused by Maxwell-Wagner (interfacial) polarization and described by Jones, Electromechanics of Particles (New York: Cambridge Univ. Press, 1995). The invention is not limited to this theory of operation. This effect has a quadratic dependence on the electric field, and is caused by an induced dipole brought about by the difference in the conductivity and dielectric permittivity (or dielectric constant) between the flake and the host fluid.

Examples of flakes 12 and their preparation are given below in Examples A–C. Examples 1–5 are of presently preferred flake/host fluid systems. It will be noted that the high end of the range of fluid conductivity (>$10^{-4}$ Mho/cm) is determined to avoid electrical breakdown (short circuits) between the substrates 16 of the device 10. The parameters of the host fluids and flake materials are also given in a Table presented below.

In addition to those materials and compositions described above, the following combinations of flakes, fluids, and materials treatments can also be used:

Flakes with angular dependent reflectivity may be prepared from a material that possesses dielectric anisotropy. Depending on the sign of the dielectric anisotropy, the orientational torque would be enhanced or diminished.

Dopants or charge control agents may be added to either the flake material or host fluid to enhance or alter their dielectric properties.

Composite angular dependent flakes may be prepared from two or more PLC materials such as PCLC and PNLC materials blended or fused.

A pitch gradient may be introduced in the helical structure of the PCLC flakes thereby extending the bandwidth of selectively reflected light so that flakes appear white.

BR flakes of specific shapes and sizes may be prepared by various methods including photolithography, embossing, cutting, stamping, or the like.

A variety of flakes may be used in a single device, and these may vary in color, dielectric properties, and optical polarization handedness.

Microencapsulation and/or other methods of flake segregation may be used to enhance display properties, provide flexible substrates, and aid in device 10 bistability: For example:

A single flake may be microencapsulated with the purpose of flake segregation, or several flakes may be microencapsulated together.

Micro-encapsulation may provide a flexible substrate such as when a flexible polymer binder is used.

In the devices of the Examples, flake motion in the presence of a DC field was not observed but did occur with an AC, sine wave-field. Using a polarizing microscope and a digital camera to track flake motion, PCLC flakes by rotating approximately 90° about one axis, typically the longest one flake motion in electric fields as low as 5 $mV_{rms}/\mu m$ (0.21 $V_{rms}$) within a specific frequency bandwidth defined as the range where the flake response time increased by a factor of 3 from the fastest response detected.

In a typical set of data for one flake (shown in FIG. 2) the flake's fastest response at 5 $mV_{rms}/\mu m$ required 47 s at 130 Hz. The frequency bandwidth extended from 45 Hz to 500 Hz for this very low magnitude field. As the magnitude of the driving field increased to 30 $mV_{rms}/\mu m$, the frequency range for motion broadened to extend from approximately 25 Hz to 1000 Hz. This six-fold increase in voltage greatly reduced the reorientation time for the flake to less than 1 s.

The reorientation times of flakes in the field of view imaged onto the digital camera (2 mm×1 mm) were examined as a function of incremental voltage increases of a 50-Hz electric field. Responses were observed for two types of flakes: (1) "small" flakes with the largest dimension of the order of 25 μm (typically square or triangular) and (2) "large" flakes with a 35- to 50-μm dimension that tended to be rectangular. The small flake's response curve in FIG. 3 shows an inverse quadratic dependence on the field ($R^2 \approx 0.98$); however, for fields larger than approximately 30 $mV_{rms}/\mu m$ (1.3 $V_{rms}$) the large flakes consistently reoriented more quickly than the small flakes.

Using the signal from the PMT to detect light reflected from a single typical flake (20×40×6 μm), it was found that the actual time necessary for a flake to rotate was less than the reorientation time measured with the digital camera through the microscope eyepiece (FIG. 4). In the present of a 0.17$V_{rms}/\mu m$ (70 Hz) field there was a delay time, $D_t$, of 140 ms for the flake to initiate movement after the field was first applied. The flake then completed the full reorientation, as determined by its reflectivity shifting from a maximum to a minimum value, with a rise time, $R_t$, of 360 ms. The total reorientation time was therefore just ~500 ms. (Here we define the reorientation time of a flake as the sum of the $D_t$ and the $R_t$). Sub-second reorientation was achieved in fields as low as $5 \times 10^{-2}$ $V_{rms}/\mu m$. The secondary intensity spike visible during $R_t$ is caused by $2^{nd}$ order selective reflection effects. A better index match of the host fluid also decrease any scattering off of flake edges, thereby increasing the contrast ratio measured at 10:1 in the examples.

EXAMPLE A

Flakes with Bragg or Bragg-like reflectivity are a PCLC material, such as non-crosslinkable cyclic polysiloxane liquid crystal polymer (CLC535 LC polysiloxane from Wacker Chemie) or a photopolymerizable PCLC system such as the cross-linkable polysiloxane polymer CLC supplied by Wacker Chemie or the cross-linkable acrylate polymer CLC produced by BASF. The PCLC materials may be processed into flakes using methods according to the procedure described by Faris et al. in U.S. Pat. No. 5,364,557 or Müller-Rees et al. in U.S. Pat. No. 5,851,604.

EXAMPLE B

Flakes with Bragg or Bragg-like reflectivity are a PCLC material (as in Example 1) that is generated to have a pitch gradient.

EXAMPLE C

Flakes with angular dependent reflectivity are a composite of different PCLC materials (as in Example 1) alone or with PNLC materials that are blended or fused to produce the flakes.

Many of the flakes in the categories above are produced using methods that result in randomly shaped flakes. This technology also extends toward flakes with identical sizes and shapes that can be produced through specific patterning techniques, such as that for patterning PCLC flakes described in U.S. patent application Ser. No. 10/383,603, filed Mar. 7, 2003, which was recently filed by some of the inventors hereof.

Flakes in all of the categories may be suspended in any chemically compatible host fluid such as propylene carbonate, poly(ethylene glycol), silicone oils, silicone oils with conductive dopants, or any miscible mixtures of these fluids. Typical flake densities ranged from 2–10 wt % in the suspending host fluid. The following examples are given for flakes in Example A, but all of the flakes, or any combination of flakes, mentioned above could be used in an analogous fashion.

EXAMPLE 1

To fabricate a device 10 for controlling the motion of flakes with Bragg or Bragg-like reflectivity, a PCLC flake suspension was created by stirring 0.08 mg of PCLC flakes (~2 wt %) into 4 ml of propylene carbonate (fluid conductivity ~$1 \times 10^{-5}$ Mho/cm). Flakes are typically 5–7 μm thick and have a longest dimension in the range of 40–100 μm. The suspension was used to fill a test device assembled using two ITO coated glass substrates 16 separated and held together by 43 μm spacer beads mixed in with epoxy. Flake reorientation can be seen for frequencies in the range from tens of Hz to hundreds of Hz. A 40 $mV_{RMS}/\mu m$ AC electric field at 100 Hz is applied to the device 10, causing a typical flake (80 μm×40 μm×6 μm) to reorient in 400 ms.

EXAMPLE 2

A 20 $mV_{rms}/\mu m$ AC electric field at 100 Hz is applied to the device 10 in Example 1, causing a typical flake to reorient in 3–4 s.

EXAMPLE 3

PCLC flakes are suspended in a poly(ethylene glycol) 200 host fluid (fluid conductivity ~$2 \times 10^{-6}$ Mho/cm), and this suspension is used to fill the device 10 described in Example 1. Flake reorientation can be seen in a frequency range from a few Hz to hundreds of Hz. A 58 $mV_{rms}/\mu m$ AC electric field at 50 Hz is applied to the test device, causing a typical flake to reorient in 10 s.

EXAMPLE 4

PCLC flakes are suspended in a host fluid mixture having 50 wt % poly(ethylene glycol) 200/50 wt % propylene carbonate (fluid conductivity $5 \times 10^{-6}$ Mho/cm), and this suspension is used to fill the device 10 described in Example 1. Flake reorientation can be seen in a frequency range from a few Hz to hundreds of Hz. For AC electric field, fields between 20 and 130 mV$_{rms}$/μm having frequencies of tens to hundreds of Hz, typical flakes reorient within tens of seconds.

EXAMPLE 5

PCLC flakes are suspended in a host fluid mixture of 50 wt % DMS-7050 silicone oil and 50 wt % propylene carbonate (fluid conductivity $\sim 1 \times 10^{-6}$ Mho/cm), and this suspension is used to fill the device 10 described in Example 1. Flake reorientation can be seen in a frequency range from a few Hz to hundreds of Hz. For AC electric field, fields between 20 and 130 mV$_{rms}$/μm having frequencies of tens to hundreds of Hz, typical flakes reorient within hundreds of seconds.

Flake/fluid host systems in all of the above examples may be microencapsulated in a suitable binder material to provide a stable and flexible matrix for the flakes. Microencapsulation in a binder medium can be done according to methods described in the above-referenced Patent Application and International Publication.

From the foregoing description, it will be apparent that there has been provided, improved electro-optic devices which are based on AC field addressable flake/host system. Variations and modifications of such devices as well as uses and applications therefore, within the scope of the invention, will undoubtedly become apparent to those skilled in the art. Accordingly, the foregoing description should be taken as illustrative and not in a limiting sense.

What is claimed is:

1. An optical device comprising a suspension of flakes with angularly dependent optical properties, the suspending liquid having a conductivity that differs from the conductivity of the material of the flakes and having a magnitude of at least about $10^{-7}$ Mho/cm.

2. The device according to claim 1 further comprising a switchable AC field, and means of including electrodes across said suspension for angular reorientation of said flakes or particles to change said characteristic when said field is applied.

3. The device according to claim 2 wherein said AC field has a frequency in the range from several Hz to thousands of Hz.

4. The device according to claim 3 wherein said field intensity varies from several to hundreds of mV$_{rms}$/μm.

5. The device according to claim 4 wherein the magnitudes of said frequency and said field intensity have dependent relationship.

| | Kinematic Viscosity[a] (cSt) | Density[a] (g/cc) | Dielectric Constant[b] | Conductivity (Mhos/cm) | Refractive Index @ λ = 589 nm | Comments |
|---|---|---|---|---|---|---|
| ISOTROPIC HOST FLUIDS | | | | | | |
| Poly(ethylene glycol) 200[i] (PEG 200) | 54 | 1.124 | 17 | $1.8 \times 10^{-6c}$ | 1.459 | Higher dielectric constant |
| Propylene Carbonate (PC)[ii] | 2.9 | 1.189 | 69 | $1 \times 10^{-5c}$ | 1.421 | Very high dielectric constant, very low viscosity |
| 50% PC/50% PEG200 | ~28[e] | ~1.15[e] | ~43[e] | $5 \times 10^{-6c}$ | Not measured | Intermediate conductivity, low viscosity |
| 50% PC/50% PDM-7050[iii,d] | ~85[e] | ~1.1[e] | ~12[e] | $1 \times 10^{-6c}$ | Not measured | Intermediate conductivity, higher viscosity |
| PCLC FLAKE MATERIALS | | | | | | |
| Wacker cyclic polysiloxanes C4754 (G2125)[iv] | — | ~1.1 | 3.0 | — | $n_{avg,ch}$ = 1.5731 @ 589.6 nm[+] | CLC535[†], $\lambda_c$ = 535 nm Material for processing into flakes. Not cross-linkable. |
| Polysiloxane crosslinked flakes[v] | — | Information not provided by supplier. Properties assumed to be similar to CLC535. | | | | CLC520, $\lambda_c$ = 520 nm Large quantities from same batch. Very uniform thickness. |
| Broadband film[vi] (BBCLC) | — | Proprietary formulation not provided by manufacturer | | | | Crosslinked films with reflectance over entire UV-VIS region. |
| BASF methacrylates CM468[vii] | — | ~1.1 | 3.5–4[‡] | — | N/A | $\lambda_c$~400 nm. Photosensitive material for processing into flakes. Cross-linked upon UV irradiation. |

[a]Measurement temperature: 20–25° C. (see references).
[b]Measured at 25° C., with the exception of propylene carbonate measured at 20° C.
[c]Measured using an YSI conductivity cell and the Solartron dielectric analyzer described in section 3.1.3.b. Table values are approximate DC conductivity values obtained by averaging the (noisy) measurements at frequencies between $10^{-3}$ and $10^{-1}$ Hz.
[d]Not specified by Gelest, but on the order $10^{-14}$ Mhos/cm.
[e]Estimated by averaging values for each property of the two components of the mixture.

6. The device according to claim 2 wherein said suspension is characterized by the time for said angular reorientation having an inverse quadratic dependence upon the magnitude of said AC field.

7. The device according to claim 1 wherein said flakes have Bragg-like angular-dependent reflective properties.

8. The device according to claim 1 wherein said flakes are of material selected from the group consisting of polymer nematic liquid crystal (PNLC), polymer cholesteric liquid crystal (PCLC) birefringent polymer (BP), and other polymer liquid crystal (PLC).

9. The device according to claim 8 wherein said PLC flakes are polymer cholesteric liquid crystal (PCLC) material.

10. The device according to claim 9 wherein said PCLC material is selected from the group consisting of cyclic polysiloxane liquid crystal polymer, cross-linkable polysiloxane polymer and cross-linkable acrylate polymer.

11. The device according to claim 7 wherein said flakes are PCLC material having a pitch gradient to present said Bragg-like reflectivity.

12. The device according to claim 1 wherein said host fluid has a conductivity in the range from about $10^{-7}$ to $10^{-4}$ Mho/cm.

13. The device according to claim 12 wherein said conductivity is at least $10^{-6}$ Mho/cm.

14. The device according to claim 13 wherein said host fluid is selected from the group consisting of polypylene carbonate and poly(ethylene glycol), silicone oils with conductive dopants sufficient to obtain said conductivity, and a miscible mixture of the foregoing fluids.

15. The device according to claim 13 wherein said host fluid is propylene carbonate having a conductivity of about $10^{-6}$ Mho/cm.

16. The device according to claim 13 wherein said host fluid is poly(ethylene glycol) having a conductivity of about $2 \times 10^{-6}$ Mho/cm.

17. The device according to claim 13 wherein said host fluid is a mixture of 50 wt % poly(ethylene glycol) and 50 wt % propylene carbonate.

18. The device according to claim 13 wherein said host fluid is 50 wt % silicone oil and 50 wt % propylene carbonate.

19. The device according to claim 13 wherein said flakes or platelets are PCLC material.

20. The device according to claim 1 wherein said flake density in the suspending host fluid is at least about 2 wt %.

21. The device according to claim 20 wherein said flake density in the suspending host fluid is in the range from about 2–10 wt %.

22. An optical device comprising a suspension of flakes which are of polymer liquid crystal material and have angularly dependent optical properties in response to an AC field in response to the dielectric properties of the suspension of flakes.

23. The device according to claim 22 wherein said polymer liquid crystal material is one of polymer nematic liquid crystal (PNLC) or polymer cholesteric liquid crystal (PCLC).

24. The device according to claim 22 further comprising means for controlling angular reorientation of said flakes to change said optical properties when said AC field is applied.

25. The device according to claim 22 wherein said AC field has a frequency in the range from several Hz to thousands of Hz.

26. The device according to claim 22 wherein said optical properties represent reflective properties of said flakes.

27. The device according to claim 22 wherein said AC field has a magnitude and a frequency, and said response of said flakes to said AC field is in accordance with at least the magnitude and frequency of said AC field.

28. The device according to claim 27 wherein said response of said flakes to said AC field is further in accordance with the shape of said flakes.

29. The device according to claim 27 wherein said dielectric properties are provided by said suspension being provided by a fluid having a conductivity that differs from the conductivity of said flakes.

30. The device of claim 22 wherein said dielectric properties are provided by a dielectric permittivity relationship of said flakes and a medium in which said flakes are suspended.

31. The device of claim 22 wherein said dielectric properties are provided by the dielectric constant of said flakes and a medium in which said flakes are suspended.

32. An optical device comprising a suspension of flakes which are of birefringent polymer material having dielectric properties which provide said flakes with angularly dependent optical properties in response to an AC field.

33. The device according to claim 32 further comprising means for controlling angular reorientation of said flakes to change said optical properties when said AC field is applied.

34. The device according to claim 32 wherein said AC field has a frequency in the range from several Hz to thousands of Hz.

35. The device according to claim 32 wherein said optical properties represent reflective properties of said flakes.

36. The device according to claim 32 wherein said AC field has a magnitude and a frequency, and said response of said flakes to said AC field is in accordance with at least the magnitude and frequency of said AC field.

37. The device according to claim 36 wherein said response of said flakes to said AC field is further in accordance with the shape of said flakes.

38. The device according to claim 32 wherein said dielectric properties are provided by said suspension being provided by a fluid having a conductivity that differs from the conductivity of said flakes.

39. The device of claim 32 wherein said dielectric properties are provided by a dielectric permittivity relationship of said flakes and a medium in which said flakes are suspended.

40. The device of claim 32 wherein said dielectric properties are provided by the dielectric constant of said flakes and a medium in which said flakes are suspended.

* * * * *